US012483835B2

(12) United States Patent
Lu

(10) Patent No.: US 12,483,835 B2
(45) Date of Patent: Nov. 25, 2025

(54) SPEAKER

(71) Applicant: BENQ CORPORATION, Taipei (TW)

(72) Inventor: Tung-Ko Lu, Taipei (TW)

(73) Assignee: BenQ Corporation, Taipei (TW)

( * ) Notice: Subject to any disclaimer, the term of this patent is extended or adjusted under 35 U.S.C. 154(b) by 335 days.

(21) Appl. No.: 18/358,921

(22) Filed: Jul. 25, 2023

(65) Prior Publication Data

US 2024/0414479 A1 Dec. 12, 2024

(30) Foreign Application Priority Data

Jun. 9, 2023 (TW) ................................ 112121745

(51) Int. Cl.

| | |
|---|---|
| ***H04R 7/26*** | (2006.01) |
| ***H04R 1/02*** | (2006.01) |
| ***H04R 7/12*** | (2006.01) |
| ***H04R 9/04*** | (2006.01) |
| ***H04R 9/06*** | (2006.01) |

(52) U.S. Cl.

CPC ............... *H04R 7/26* (2013.01); *H04R 1/023* (2013.01); *H04R 7/12* (2013.01); *H04R 9/046* (2013.01); *H04R 9/06* (2013.01); *H04R 2307/021* (2013.01); *H04R 2307/201* (2013.01)

(58) Field of Classification Search

CPC . H04R 7/26; H04R 1/023; H04R 7/12; H04R 9/046; H04R 9/06; H04R 2307/021; H04R 2307/201; H04R 9/043

See application file for complete search history.

(56) References Cited

U.S. PATENT DOCUMENTS

| | | | | |
|---|---|---|---|---|
| 6,154,556 A * | 11/2000 | Takahashi | ................ | H04R 9/06 381/430 |
| 7,324,658 B2 * | 1/2008 | Kobayashi | ............... | H04R 7/18 381/396 |
| 7,505,603 B2 * | 3/2009 | Yoo | ........................ | H04R 9/043 381/404 |
| 7,801,324 B2 * | 9/2010 | Kimura | .................... | H04R 9/06 381/430 |

(Continued)

FOREIGN PATENT DOCUMENTS

| | | |
|---|---|---|
| CN | 209562789 | 10/2019 |
| CN | 211656366 | 10/2020 |

(Continued)

OTHER PUBLICATIONS

"Office Action of Taiwan Counterpart Application", issued on Jun. 7, 2024, p. 1-p. 8.

*Primary Examiner* — Forrest M Phillips
*Assistant Examiner* — Joseph James Peter Illicete

(57) ABSTRACT

A speaker, including a paper cone, a damping ring, a damper, a magnetic assembly, and a voice coil, is provided. The damping ring is integrally connected to the paper cone. The damping ring has a first side edge and a second side edge opposite to each other, and the first side edge is connected to the paper cone. The damper has an inner edge and an outer edge. The outer edge abuts against the second side edge of the damping ring. The magnetic assembly abuts against the inner edge of the damper. The paper cone, the damping ring, the damper, and the magnetic assembly define a space. The voice coil is disposed in the space and abuts against the paper cone.

20 Claims, 8 Drawing Sheets

(56) References Cited

U.S. PATENT DOCUMENTS

| | | | | |
|---|---|---|---|---|
| 7,986,805 | B2 * | 7/2011 | Nagaoka | H04R 31/003 181/163 |
| 8,290,201 | B2 * | 10/2012 | Kamimura | H04R 9/043 381/396 |
| 9,055,359 | B2 * | 6/2015 | Kamimura | H04R 31/00 |
| 9,351,078 | B2 * | 5/2016 | Huang | H04R 31/00 |
| 9,788,122 | B2 * | 10/2017 | Huang | H04R 31/003 |
| 10,939,209 | B2 * | 3/2021 | Chen | H04R 7/12 |
| 11,432,091 | B2 * | 8/2022 | Lin | C08K 7/14 |
| 11,553,272 | B2 * | 1/2023 | Coote | H04R 7/20 |
| 12,375,848 | B2 * | 7/2025 | Sugata | H04R 9/02 |
| 2020/0107112 | A1 * | 4/2020 | Lu | H04R 1/2819 |
| 2023/0328436 | A1 * | 10/2023 | Yamamoto | H04R 9/06 381/98 |

FOREIGN PATENT DOCUMENTS

| | | |
|---|---|---|
| CN | 215818595 | 2/2022 |
| CN | 113840216 | 9/2022 |

* cited by examiner

SPEAKER

CROSS-REFERENCE TO RELATED APPLICATION

This application claims the priority benefit of Taiwan application serial no. 112121745, filed on Jun. 9, 2023. The entirety of the above-mentioned patent application is hereby incorporated by reference herein and made a part of this specification.

BACKGROUND

Technical Field

The disclosure relates to an acoustic device, and more particularly to a speaker.

Description of Related Art

A speaker produces sound by driving the sound membrane to vibrate through the coil under the action of the magnetic field to drive the air to vibrate. The existing sound membrane is composed of a paper cone and a ring. After the paper cone, a voice coil, and a damper are assembled, an annular damping component is required to be attached to the outside of a drum annulus portion of the ring, so that the sound membrane can be better mounted between the body and the cone frame of the speaker. However, the above method is to attach the annular damping component to the ring, so the problem of poor positioning may occur. In order to solve the above problem, the existing technology allows the sound membrane to have its own damping ring. The damping ring is located on the outside of the drum annulus portion relatively away from the paper cone and has a certain height, so the stability of the up and down vibration of the voice coil is poor and the overall height of the speaker cannot be reduced.

SUMMARY

The disclosure provides a speaker, which can reduce the overall height, improve the stability of the linear (up and down) vibration of a voice coil, and prevent the voice coil from jittering and deflecting.

The speaker of the disclosure includes a paper cone, a damping ring, a damper, a magnetic assembly, and a voice coil. The damping ring is integrally connected to the paper cone. The damping ring has a first side edge and a second side edge opposite to each other, and the first side edge is connected to the paper cone. The damper has an inner edge and an outer edge. The outer edge abuts against the second side edge of the damping ring. The magnetic assembly abuts against the inner edge of the damper. The paper cone, the damping ring, the damper, and the magnetic assembly define a space. The voice coil is disposed in the space and abuts against the paper cone.

In an embodiment of the disclosure, the paper cone has an opening, the voice coil is disposed corresponding to the opening and abuts against a circumference of the opening, and the opening exposes a surface of the voice coil.

In an embodiment of the disclosure, the speaker further includes a dustproof cover disposed on the opening of the paper cone to cover the surface of the voice coil exposed by the opening.

In an embodiment of the disclosure, the damper includes a hollow frame body and multiple annular structures. The hollow frame body has the inner edge and the outer edge. The annular structures are separately disposed on the hollow frame body and located between the inner edge and the outer edge. The hollow frame body and the annular structures define a wavy surface.

In an embodiment of the disclosure, an outer diameter of the outer edge of the hollow frame body is greater than or equal to a diameter of the damping ring.

In an embodiment of the disclosure, the magnetic assembly includes a yoke, a magnet, and a washer. The yoke abuts against the inner edge of the damper. The magnet is disposed in the yoke. The washer is disposed on the magnet.

In an embodiment of the disclosure, the voice coil has an opening, and the washer and a part of the magnet are located in the opening.

In an embodiment of the disclosure, the paper cone, the damping ring, the damper, and the yoke define the space. The voice coil, the magnet, and the washer are located in the space.

In an embodiment of the disclosure, the speaker further includes a suspension edge structure connected to the paper cone and including a first connecting portion, a second connecting portion, and a drum annulus portion. The first connecting portion is connected to the paper cone, and the drum annulus portion surrounds and is connected between the first connecting portion and the second connecting portion.

In an embodiment of the disclosure, the speaker further includes a cone frame having a first assembly port and a second assembly port. The first assembly port abuts against the second connecting portion of the suspension edge structure. The magnetic assembly passes through the second assembly port and abuts against the inner edge of the damper.

In an embodiment of the disclosure, the cone frame includes a base portion, a surrounding portion, and multiple connecting portions. The connecting portions are separated from each other and obliquely connected between the base portion and the surrounding portion. The surrounding portion has the first assembly port, and the base portion has the second assembly port.

In an embodiment of the disclosure, the base portion, the surrounding portion, and the connecting portion are integrally formed.

In an embodiment of the disclosure, an orthographic projection of the drum annulus portion on the base portion does not overlap with an orthographic projection of the damper on the base portion.

In an embodiment of the disclosure, an inner diameter of the surrounding portion is greater than an outer diameter of the base portion.

In an embodiment of the disclosure, a first diameter of the first assembly port is greater than a second diameter of the second assembly port.

In an embodiment of the disclosure, the first connecting portion, the second connecting portion, and the drum annulus portion are integrally formed.

In an embodiment of the disclosure, the suspension edge structure is integrally connected to the paper cone.

In an embodiment of the disclosure, the drum annulus portion is located outside the space defined by the paper cone, the damping ring, the damper, and the magnetic assembly.

In an embodiment of the disclosure, a first height of the damping ring is greater than a second height of the drum annulus portion.

In an embodiment of the disclosure, the first side edge of the damping ring is vertically connected to the paper cone.

Based on the above, in the design of the speaker of the disclosure, the damping ring is integrally connected to the paper cone, the first side edge of the damping ring is connected to the paper cone, the second side edge of the damping ring and the magnetic assembly respectively abut against the outer edge and the inner edge of the damper, and the voice coil is disposed in the space defined by the paper cone, the damping ring, the damper, and the magnetic assembly, and abuts against the paper cone. In this way, the overall height of the speaker can be effectively reduced, the stability of the linear (up and down) vibration of the voice coil can be improved, and the jitter and deflection of the voice coil can be prevented.

To make the aforementioned more comprehensible, several embodiments accompanied with drawings are described in detail as follows.

DESCRIPTION OF THE EMBODIMENTS

Figure 1A:
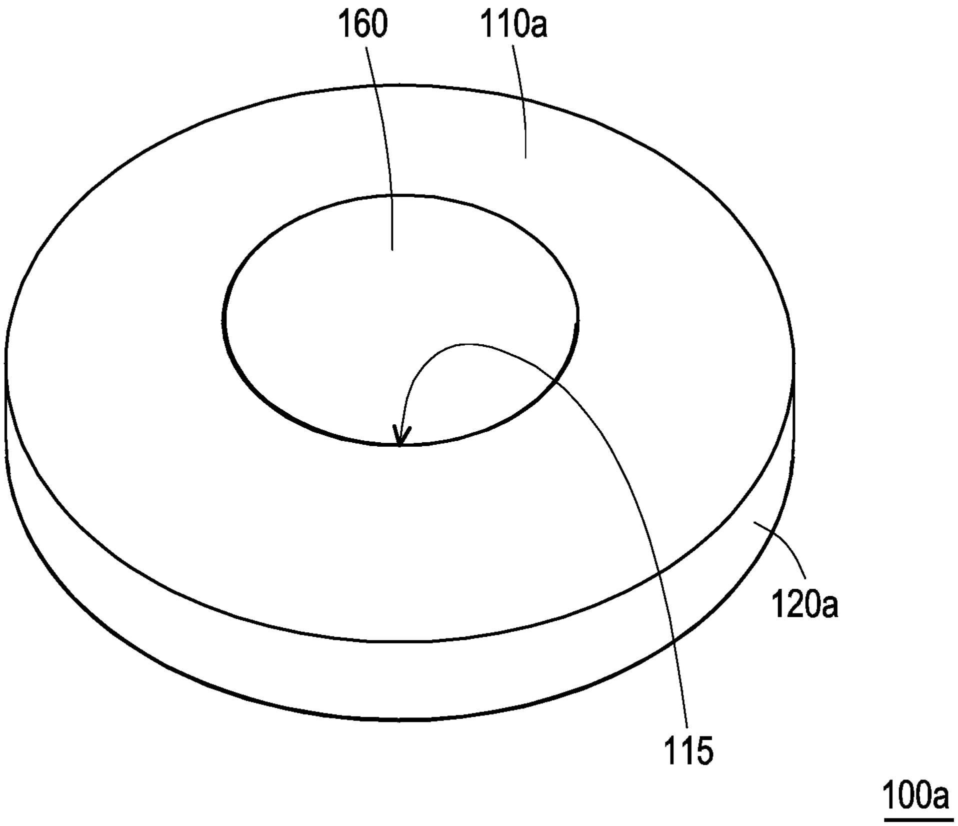
FIG. 1A is a perspective schematic view of a speaker according to an embodiment of the disclosure.
Figure 1B:
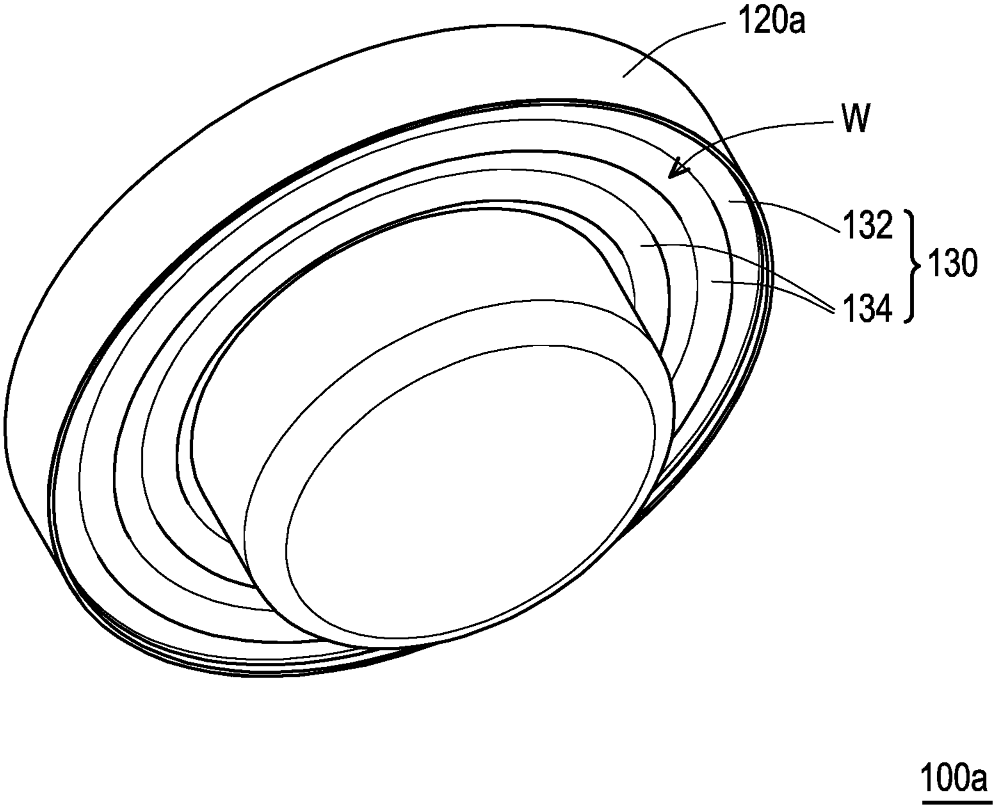
FIG. 1B is a perspective schematic view of another viewing angle of FIG. 1A.
Figure 1C:
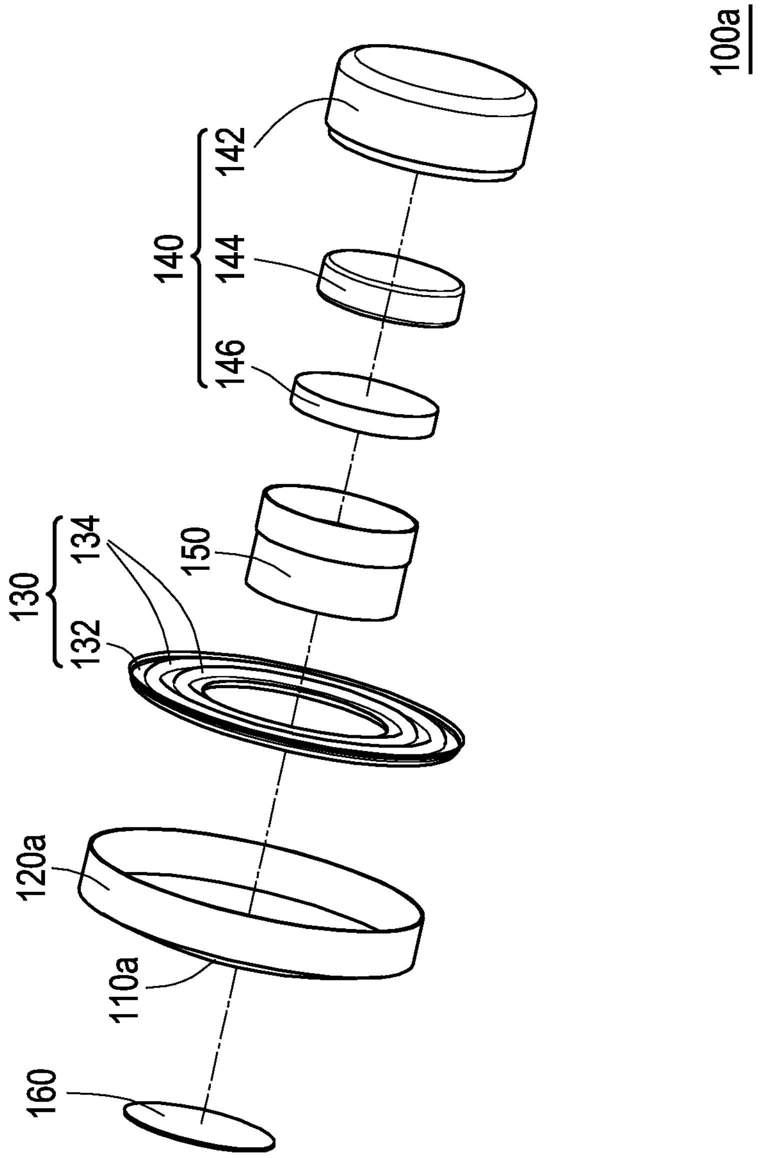
FIG. 1C is a perspective exploded schematic view of FIG. 1A.
Figure 1D:
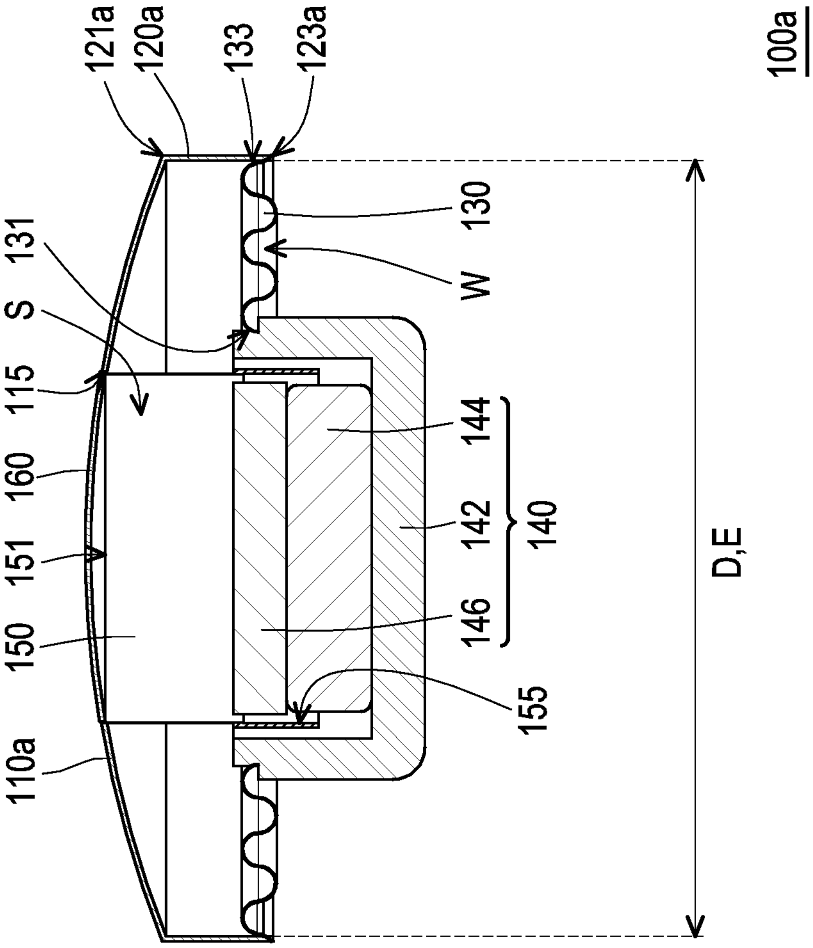
FIG. 1D is a cross-sectional schematic view of FIG. 1A.

FIG. 1A is a perspective schematic view of a speaker according to an embodiment of the disclosure. FIG. 1B is a perspective schematic view of another viewing angle of FIG. 1A. FIG. 1C is a perspective exploded schematic view of FIG. 1A. FIG. 1D is a cross-sectional schematic view of FIG. 1A.

Please refer to FIG. 1A, FIG. 1B, FIG. 1C, and FIG. 1D at the same time. In this embodiment, a speaker 100*a* includes a paper cone 110*a*, a damping ring 120*a*, a damper 130, a magnetic assembly 140, and a voice coil 150. The damping ring 120*a* is integrally connected to the paper cone 110*a*. The damping ring 120*a* has a first side edge 121*a* and a second side edge 123*a* opposite to each other, and the first side edge 121*a* is connected to the paper cone 110*a*. The damper 130 has an inner edge 131 and an outer edge 133. The outer edge 133 of the damper 130 abuts against the second side edge 123*a* of the damping ring 120*a*. The magnetic assembly 140 abuts against the inner edge 131 of the damper 130. The paper cone 110*a*, the damping ring 120*a*, the damper 130, and the magnetic assembly 140 define a space S. The voice coil 150 is disposed in the space S and abuts against the paper cone 110*a*.

In detail, please refer to FIG. 1A, FIG. 1C, and FIG. 1D at the same time. In this embodiment, the paper cone 110*a* and the damping ring 120*a* are specifically an integral structure, which means a seamless connection. The first side edge 121*a* of the damping ring 120*a* is vertically connected to the paper cone 110*a*. That is to say, the paper cone 110*a* of this embodiment adopts the design without suspension edges, which can not only increase the vibration area, but also be used as a single unit of a coaxial speaker. Furthermore, the paper cone 110*a* of this embodiment has an opening 115. The voice coil 150 is disposed corresponding to the opening 115 and abuts against the circumference of the opening 115. The opening 115 exposes a surface 151 of the voice coil 150. In addition, the speaker 100*a* of this embodiment may further include a dustproof cover 160 disposed on the opening 115 of the paper cone 110*a* to cover the surface 151 of the voice coil 150 exposed by the opening 115. In an embodiment, the dustproof cover 160 is connected to the paper cone 110*a* through glue connection.

Next, please refer to FIG. 1C and FIG. 1D. The damper 130 of this embodiment includes a hollow frame body 132 and multiple annular structures 134. The hollow frame body 132 has the inner edge 131 and the outer edge 133. The annular structures 134 are separately disposed on the hollow frame body 132 and located between the inner edge 131 and the outer edge 133. The hollow frame body 132 and the annular structures 134 define a wavy surface W. In an embodiment, the inner edge 131 and the outer edge 133 of the damper 130 are respectively connected to the magnetic assembly 140 and the second side edge 123*a* of the damping ring 120*a* through glue connection. Here, an outer diameter D of the outer edge 133 of the hollow frame body 132 of the damper 130 may be greater than or equal to a diameter E of the damping ring 120*a*.

In addition, please refer to FIG. 1B, FIG. 1C, and FIG. 1D. The magnetic assembly 140 of this embodiment includes a yoke 142, a magnet 144, and a washer 146. The yoke 142 abuts against the inner edge 131 of the damper 130. The magnet 144 is disposed in the yoke 142, and the washer 146 is disposed on the magnet 144. In this embodiment, the voice coil 150 has an opening 155. The washer 146 and a part of the magnet 144 are located in the opening 155. Here, the paper cone 110*a*, the damping ring 120*a*, the damper 130, and the yoke 142 define the space S. The voice coil 150, the magnet 144, and the washer 146 are located in the space S.

The damping ring 120*a* is integrally connected to the paper cone 110*a*, in which the first side edge 121*a* of the damping ring 120*a* is connected to the paper cone 110*a*, and the second side edge 123*a* of the damping ring 120*a* and the magnetic assembly 140 respectively abut against the outer edge 131 and the inner edge 133 of the damper 130. Furthermore, the voice coil 150 is disposed in the space S defined by the paper cone 110*a*, the damping ring 120*a*, the damper 130, and the magnetic assembly 140, and abuts against the paper cone 110*a*. In this way, the voice coil 150 and the paper cone 110*a* are suspended by the damping ring 120*a*, which can effectively reduce the overall height of the speaker 100*a*, improve the stability of the linear (up and down) vibration of the voice coil 150, and prevent the voice coil 150 from jittering and deflecting. In addition, compared with the speaker in the related art that has a cone frame, the speaker 100*a* of this embodiment does not have a cone frame, so components and processing costs can be reduced.

It should be noted here that the following embodiments continue to use the reference numerals and some content of the foregoing embodiment, wherein the same reference numerals are adopted to indicate the same or similar elements, and the description of the same technical content is omitted. The description of the omitted parts can be found in the foregoing embodiment and will not be repeated in the following embodiments.

Figure 2A:
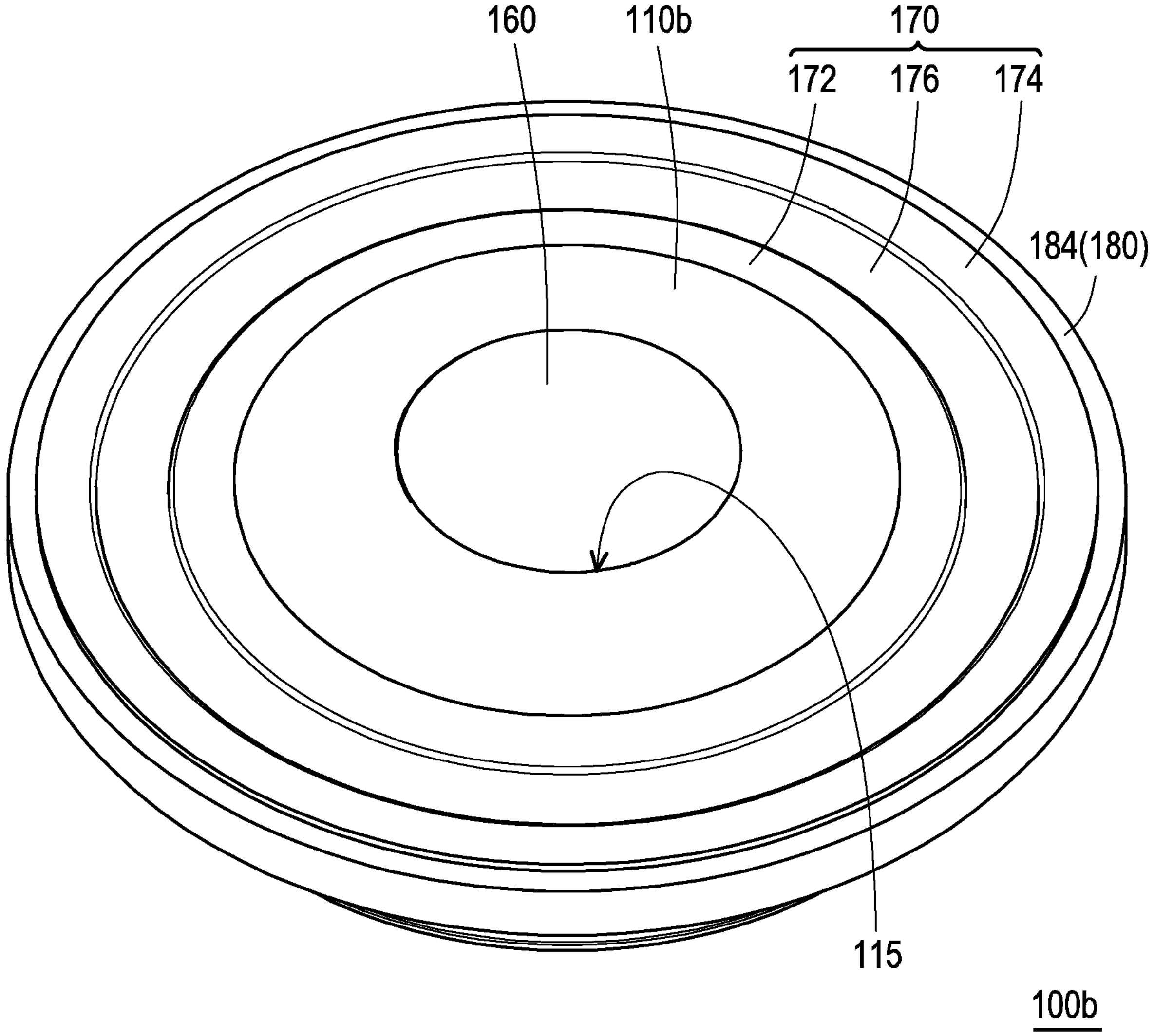
FIG. 2A is a perspective schematic view of a speaker according to another embodiment of the disclosure.
Figure 2B:
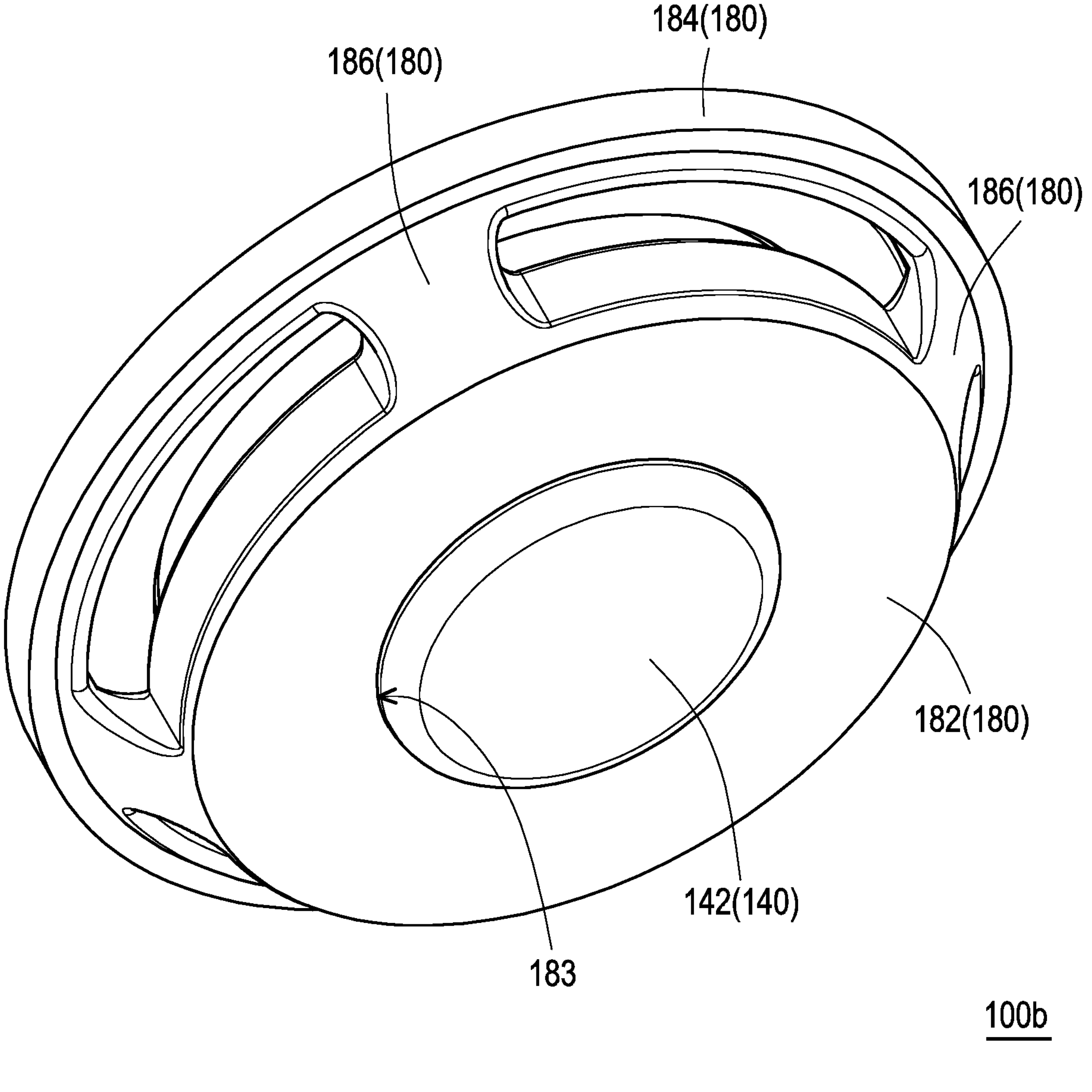
FIG. 2B is a perspective schematic view of another viewing angle of FIG. 2A.
Figure 2C:
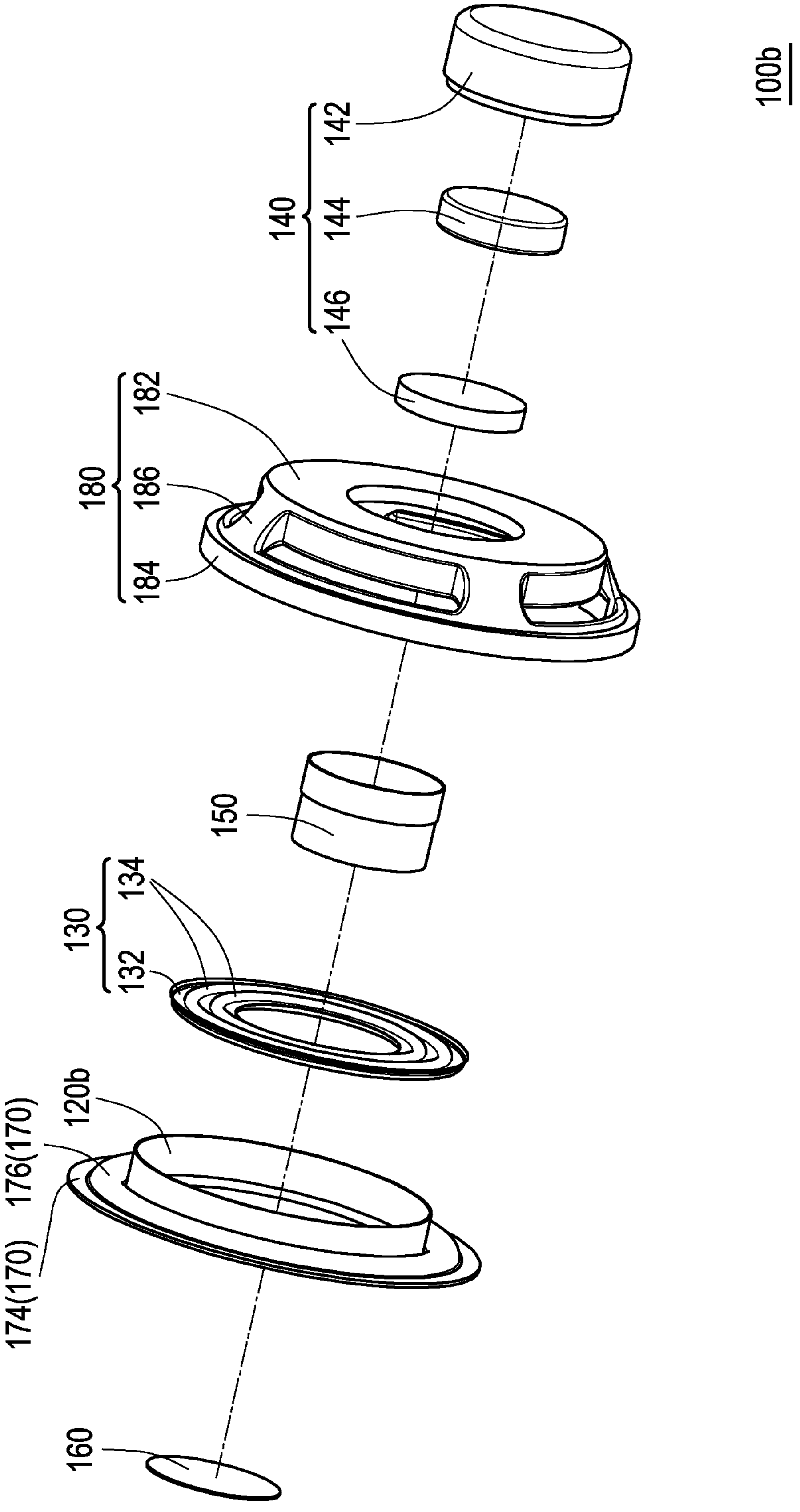
FIG. 2C is a perspective exploded schematic view of FIG. 2A.
Figure 2D:
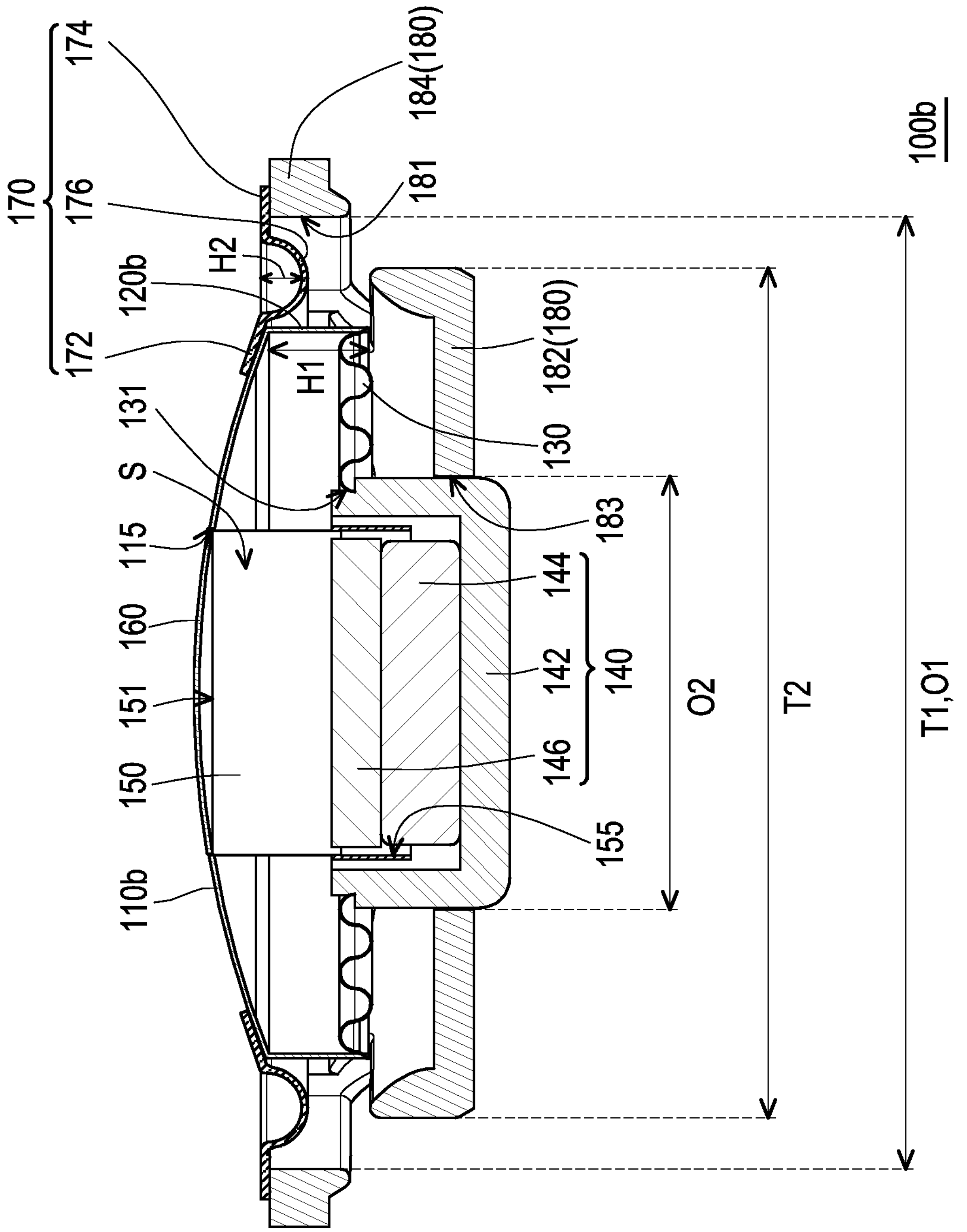
FIG. 2D is a cross-sectional schematic view of FIG. 2A.

FIG. 2A is a perspective schematic view of a speaker according to another embodiment of the disclosure. FIG. 2B is a perspective schematic view of another viewing angle of FIG. 2A. FIG. 2C is a perspective exploded schematic view of FIG. 2A. FIG. 2D is a cross-sectional schematic view of FIG. 2A. Please refer to FIG. 1C, FIG. 1D, FIG. 2C, and FIG. 2D at the same time. A speaker 100*b* of this embodiment is similar to the speaker 100*a*. The difference between the two is that in this embodiment, the speaker 100*b* further includes a suspension edge structure 170 and a cone frame 180.

In detail, please refer to FIG. 2A, FIG. 2C, and FIG. 2D at the same time. In this embodiment, the suspension edge structure 170 is connected to a paper cone 110*b*, and the suspension edge structure 170 includes a first connecting portion 172, a second connecting portion 174, and a drum annulus portion 176. The first connecting portion 172 is connected to the paper cone 110*b*, and the drum annulus portion 176 surrounds and is connected between the first connecting portion 172 and the second connecting portion 174. The drum annulus portion 176 of the suspension edge structure 170 is located outside the space S defined by the paper cone 110*b*, a damping ring 120*b*, the damper 130, and the magnetic assembly 140, which means that the damping ring 120*b* is closer to the voice coil 150 than the drum annulus portion 176 of the suspension edge structure 170, which can effectively improve the stability of the linear (up and down) vibration of the voice coil 150 and prevent the voice coil 150 from jittering and deflecting. Here, a first height H1 of the damping ring 120*b* is greater than a second height H2 of the drum annulus portion 176. In an embodiment, the first connecting portion 172, the second connecting portion 174, and the drum annulus portion 176 of the suspension edge structure 170 are an integral structure. In an embodiment, the suspension edge structure 170 may also be integrally connected to the paper cone 110*b*, which means that the paper cone 110*b*, the damping ring 120*b*, and the suspension edge structure 170 may be an integral structure.

Furthermore, please refer to FIG. 2B, FIG. 2C, and FIG. 2D at the same time. The cone frame 180 of this embodiment has a first assembly port 181 and a second assembly port 183. The first assembly port 181 abuts against the second connecting portion 174 of the suspension edge structure 170. The magnetic assembly 140 passes through the second assembly port 183 and abuts against the inner edge 131 of the damper 130. In an embodiment, the cone frame 180 may be respectively connected to the suspension edge structure 170 and the magnetic assembly 140 through glue connection. Furthermore, the cone frame 180 of this embodiment includes a base portion 182, a surrounding portion 184, and multiple connecting portions 186. The connecting portions 186 are separated from each other and obliquely connected between the base portion 182 and the surrounding portion 184. The surrounding portion 184 has the first assembly port 181, and the base portion 182 has the second assembly port 183. Here, an inner diameter T1 of the surrounding portion 184 of the cone frame 180 is greater than an outer diameter T2 of the base portion 182 of the cone frame 180. A first diameter O1 of the first assembly port 181 is greater than a second diameter O2 of the second assembly port 183. In an embodiment, the base portion 182, the surrounding portion 184, and the connecting portion 186 may be an integral structure. In addition, the orthographic projection of the drum annulus portion 176 of the suspension edge structure 170 on the base portion 182 of the cone frame 180 does not overlap with the orthographic projection of the damper 130 on the base portion 182 of the cone frame 180. In an embodiment, the stroke (i.e. linear motion) of the suspension edge structure 170 is smaller than the stroke of the damping ring 120*b*, and the stroke of the damper 130 is smaller than the stroke of the suspension edge structure 170.

To sum up, in the design of the speaker of the disclosure, the damping ring is integrally connected to the paper cone. The first side edge of the damping ring is connected to the paper cone. The second side edge of the damping ring and the magnetic assembly respectively abut against the outer edge and the inner edge of the damper. The voice coil is disposed in the space defined by the paper cone, the damping ring, the damper, and the magnetic assembly, and abuts against the paper cone. In this way, the overall height of the speaker can be effectively reduced, the stability of the linear (up and down) vibration of the voice coil can be improved, and the jitter and deflection of the voice coil can be prevented.

Although the disclosure has been described in detail with reference to the above embodiments, the embodiments are not intended to limit the disclosure. Persons skilled in the art should understand that it is possible to make changes and modifications without departing from the spirit and scope of the disclosure. Therefore, the protection scope of the disclosure shall be defined by the following claims.

What is claimed is:

1. A speaker, comprising:
- a paper cone;
- a damping ring, integrally connected to the paper cone, wherein the damping ring has a first side edge and a second side edge opposite to each other, and the first side edge is connected to the paper cone;
- a damper, having an inner edge and an outer edge, wherein the outer edge abuts against the second side edge of the damping ring;
- a magnetic assembly, abutting against the inner edge of the damper, wherein the paper cone, the damping ring, the damper, and the magnetic assembly define a space; and
- a voice coil, disposed in the space and abutting against the paper cone.

2. The speaker according to claim 1, wherein the paper cone has an opening, the voice coil is disposed corresponding to the opening and abuts against a circumference of the opening, and the opening exposes a surface of the voice coil.

3. The speaker according to claim 2, further comprising:
- a dustproof cover, disposed on the opening of the paper cone to cover the surface of the voice coil exposed by the opening.

4. The speaker according to claim 1, wherein the damper comprises:
- a hollow frame body, having the inner edge and the outer edge; and
- a plurality of annular structures, separately disposed on the hollow frame body and located between the inner edge and the outer edge, wherein the hollow frame body and the annular structures define a wavy surface.

5. The speaker according to claim 4, wherein an outer diameter of the outer edge of the hollow frame body is greater than or equal to a diameter of the damping ring.

6. The speaker according to claim 1, wherein the magnetic assembly further comprises:
- a yoke, abutting against the inner edge of the damper;
- a magnet, disposed in the yoke; and
- a washer, disposed on the magnet.

7. The speaker according to claim 6, wherein the voice coil has an opening, and the washer and a part of the magnet are located in the opening.

8. The speaker according to claim 6, wherein the paper cone, the damping ring, the damper, and the yoke define the space, and the voice coil, the magnet, and the washer are located in the space.

9. The speaker according to claim 1, further comprising:
a suspension edge structure, connected to the paper cone and comprising a first connecting portion, a second connecting portion, and a drum annulus portion, wherein the first connecting portion is connected to the paper cone, and the drum annulus portion surrounds and is connected between the first connecting portion and the second connecting portion.

10. The speaker according to claim 9, further comprising:
a cone frame, having a first assembly port and a second assembly port, wherein the first assembly port abuts against the second connecting portion of the suspension edge structure, and the magnetic assembly passes through the second assembly port and abuts against the inner edge of the damper.

11. The speaker according to claim 10, wherein the cone frame comprises a base portion, a surrounding portion, and a plurality of connecting portions, the connecting portions are separated from each other and obliquely connected between the base portion and the surrounding portion, the surrounding portion has the first assembly port, and the base portion has the second assembly port.

12. The speaker according to claim 11, wherein the base portion, the surrounding portion, and the connecting portion are integrally formed.

13. The speaker according to claim 11, wherein an orthographic projection of the drum annulus portion on the base portion does not overlap an orthographic projection of the damper on the base portion.

14. The speaker according to claim 11, wherein an inner diameter of the surrounding portion is greater than an outer diameter of the base portion.

15. The speaker according to claim 10, wherein a first diameter of the first assembly port is greater than a second diameter of the second assembly port.

16. The speaker according to claim 9, wherein the first connecting portion, the second connecting portion, and the drum annulus portion are integrally formed.

17. The speaker according to claim 9, wherein the suspension edge structure is integrally connected to the paper cone.

18. The speaker according to claim 9, wherein the drum annulus portion is located outside the space defined by the paper cone, the damping ring, the damper, and the magnetic assembly.

19. The speaker according to claim 9, wherein a first height of the damping ring is greater than a second height of the drum annulus portion.

20. The speaker according to claim 1, wherein the first side edge of the damping ring is vertically connected to the paper cone.

* * * * *